(12) United States Patent
Yamagiwa

(10) Patent No.: US 6,338,766 B1
(45) Date of Patent: Jan. 15, 2002

(54) RETENTION MOLD FOR BONDING TIRE TUBE

(75) Inventor: Toshio Yamagiwa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/253,002

(22) Filed: Feb. 19, 1999

(30) Foreign Application Priority Data

Feb. 27, 1998 (JP) .......................................... 10-046842

(51) Int. Cl.⁷ .............................................. B29D 23/24
(52) U.S. Cl. ...................... 156/115; 156/122; 152/506; 152/512
(58) Field of Search ................................ 156/122, 217, 156/115, 503, 421.6; 152/511, 512, 506

(56) References Cited

U.S. PATENT DOCUMENTS

| | | | | |
|---|---|---|---|---|
| 1,786,499 A | * | 12/1930 | Maynard | 156/421.6 |
| 1,865,669 A | * | 7/1932 | Bostwick | 156/122 |
| 2,541,696 A | * | 2/1951 | George | 156/503 |
| 2,675,854 A | * | 4/1954 | Engler | 156/503 |
| 3,506,516 A | * | 4/1970 | Baumann | 156/217 |
| 3,881,983 A | * | 5/1975 | Smith | 156/122 |

FOREIGN PATENT DOCUMENTS

| | | | | |
|---|---|---|---|---|
| EP | 818302 | * | 1/1998 | 156/115 |
| JP | 9164806 | | 6/1997 | |
| JP | 10-16518 | * | 1/1998 | 152/506 |

* cited by examiner

*Primary Examiner*—Geoffrey L. Knable

(57) ABSTRACT

To make it possible to precisely bond a tube blank having thickened portions projecting from an outer wall surface of a retention mold. A tube blank is formed of natural rubber and is provided with an air chamber peripheral wall, a sealant chamber peripheral wall and a partition. The tube blank has ends held by the retention mold which are bonded in an annular shape. The retention molds include an upper mold and a lower mold having respective retaining surfaces. Indents are provided in the retaining surface of the lower mold for engaging with the thickened portions projecting from the air chamber peripheral wall of the tube blank. By forming the indents in the retention surfaces of the lower molds, it is possible to hold the two ends of the tube blank without warping the tube blank and to precisely bond the two ends of the tube blank together.

4 Claims, 8 Drawing Sheets

FIG. 3
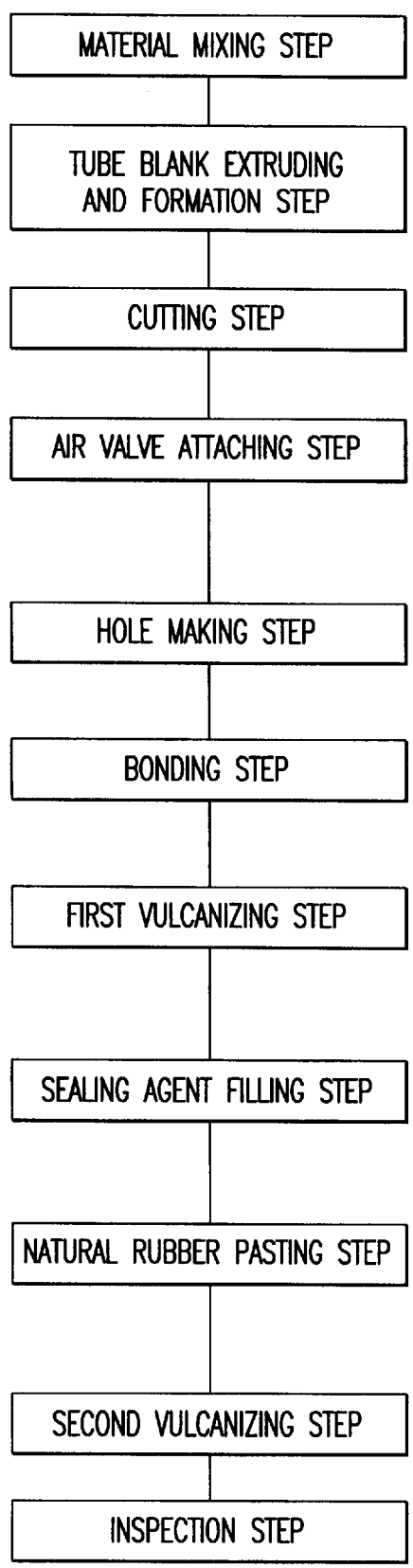
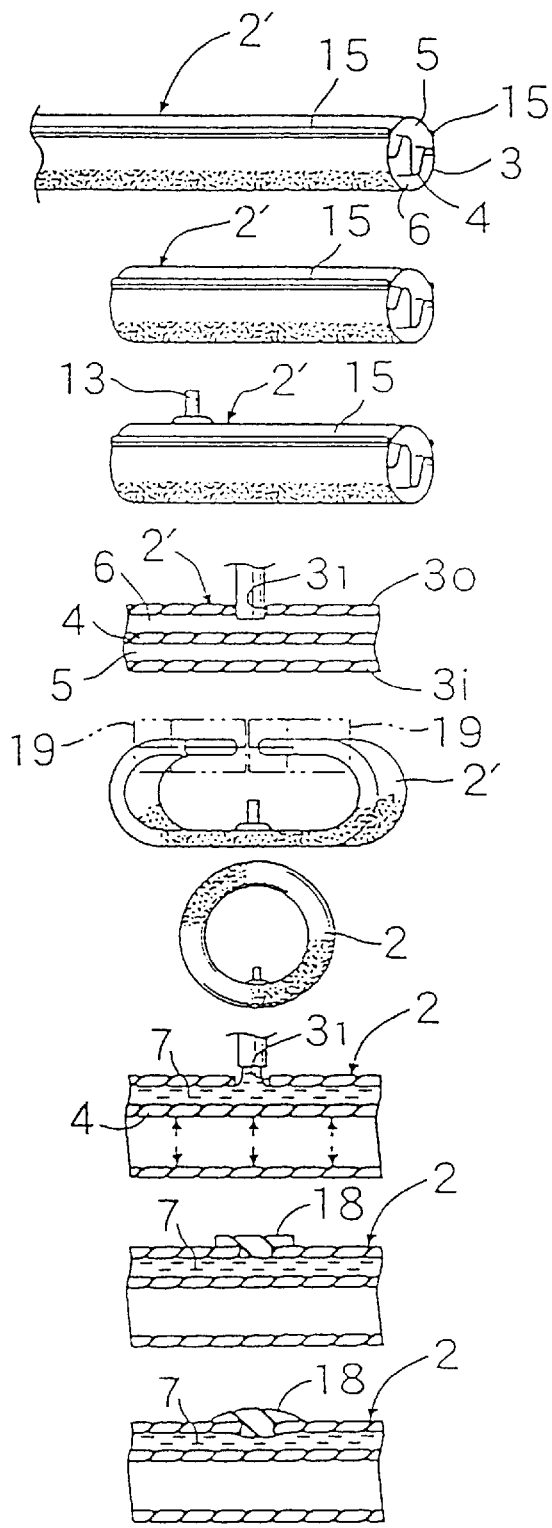

RETENTION MOLD FOR BONDING TIRE TUBE

BACKGROUND OF THE INVENTION

1. Field of the Invention

The present invention relates to a retention mold for bonding a tire tube to make an annular tire tube. Both ends of a tube blank which has thickened parts for reinforcement are horizontally retained, protruding from an outer wall surface of freely opening and closing retention molds. The ends of the tube blank are then bonded to each other.

2. Description of Related Art

If a radial load acts on a vehicle wheel which has tube tires, the shape of the tire and the tube change as a result of the load. In particular, when a tire runs aground on hard obstacles such as rocks when travelling off-road or when a tire hits the ground after a vehicle lands from a jump, the tube is subjected to a large pinching pressure between the tire, whose shape has been largely deformed, and a metal rim. Therefore, a rim strike phenomenon arises where respective inner wall surfaces of the tube are brought into contact with each other. If the respective inner wall surfaces of the tube are brought into contact with each other as a result of the rim strike phenomenon, the durability of the contacting parts is sometimes reduced.

A way of preventing the above described lowering of the durability has been disclosed in Japanese Patent Laid-open No. Hei. 9-164806. The tube of this reference includes thickened portions for reinforcement which project from the wall surfaces of a tube that is likely to suffer from damage due to the rim strike phenomenon.

An annular tire tube is manufactured by horizontally retaining both ends of a tube blank with freely opening and closing retention molds and bonding together both ends of the tube blank. However, if the tube blank is retained by retention molds which have flat holding surfaces, the above described thickened portion becomes a hindrance and it is not possible to reliably hold the tube blank. Therefore, warping occurs in the tube blank and precise bonding of the ends of the tube blank becomes difficult. This problem is particularly striking when there are-thickened portions projecting from outer wall surfaces of the tube blank directly contacting the retaining surfaces of the retention molds.

SUMMARY OF THE INVENTION

The present invention has been conceived in view of the above described problems. The object of the present invention is to provide a retaining mold for tire tube bonding that enables precise bonding of a tube blank having thickened portions projecting from outer wall surfaces of the retaining mold.

In order to achieve the above described object, the present invention provides a retention mold for bonding a tire tube, for forming an annular tire tube by horizontally retaining both ends of a tube blank, which has thickened parts for reinforcement, protruding from an outer wall surface of freely opening and closing retention molds and bonding both ends together, wherein indents for engaging with the thickened parts are formed in retention surfaces of the retention molds coming into contact with an outer wall surface of the tube blank.

With the above described construction, when both ends of the tube blank are horizontally retained in the freely opening and closing retention molds and bonded together, it is possible to hold the material without warping being caused and to achieve precise bonding by forming indents on the holding surfaces of the retention molds for engaging with the thickened parts projecting from the outer surfaces of the tube blank.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is a drawing showing a process of manufacturing a tube according to the first embodiment of the present invention;

DESCRIPTION OF THE PREFERRED EMBODIMENTS

Figure 1:
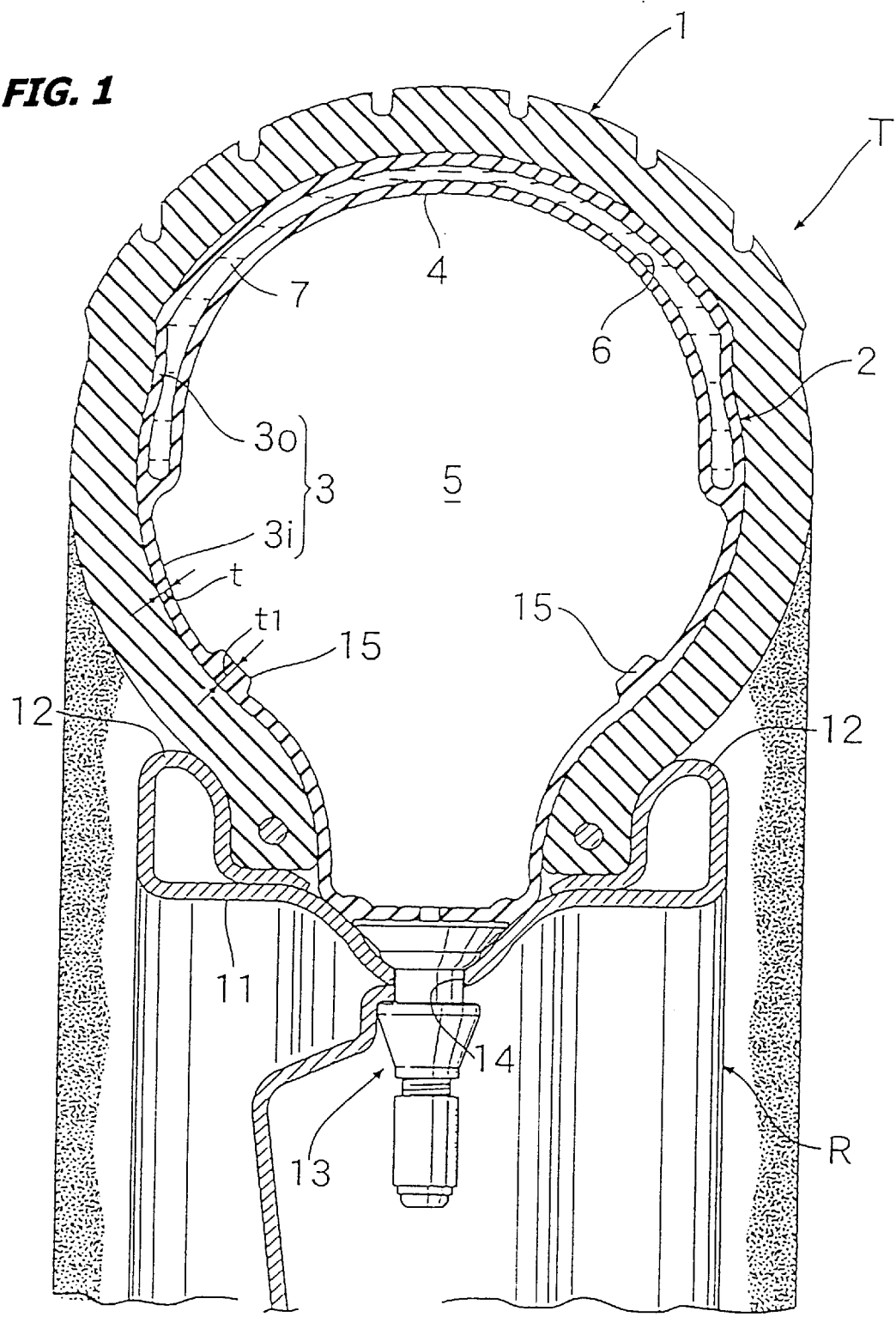
FIG. 1 is a cross sectional drawing of a wheel holding a tube tire according to a first embodiment of the present invention.

The present invention will now be described with reference to the accompanying drawings. FIG. 1 to FIG. 6 show a first embodiment of the present invention. Referring to FIG. 1, a tube tire T includes a tire body 1 and a tube 2 located inside the tire body 1. The tube tire T is held on a rim R of a motorcycle wheel. The tube 2 has a peripheral wall 3 having an annular cross section and including an air chamber peripheral wall 3*i* positioned inside in a radial direction, and a sealant chamber peripheral wall 3*o* positioned outside in a radial direction. A pair of connecting sections for connecting the air chamber peripheral wall 3*i* and the sealant chamber peripheral wall 3*o* are connected together by a partition 4 integrally formed with the connecting section.

An air chamber 5 having a substantially circular cross section is defined between the sealant chamber peripheral wall 3*o* and the partition 4. The air chamber 5 is filled with air. A sealant chamber 6 has a substantially arc shaped cross section and is defined between the sealant chamber peripheral wall 3*o* and the partition 4. The sealant chamber 6 is filled with a known liquid sealant.

The rim R is comprised of a rim body section 11 extending annularly in a circumferential direction of the tube tire 1. A pair of flange sections 12, 12 extend radially outwards along both edges of the rim body section 11 for holding the inner circumference of the tire. An air valve through which air is pumped into the air chamber 5 is formed inside the tube 2 and is supported penetrating through an air valve attachment section 14 formed in the rim body section 11.

A pair of thickened portions 15, 15 project from the inner wall surface of the air chamber peripheral wall 3$i$ of the tube 2 to prevent damage to the tube 2 as a result of an impulsive load when an impulsive load acts on the tube tire T causing inner wall surfaces of the air chamber 5 to come into contact with each other. The wall thickness t1 of the thickened portions 15, 15 is set to be about 1.5–3.0 times the wall thickness t of the remaining thin sections.

Since the sealant chamber 6 of the tube 2 retains its shape along the inner surface of the tire body 1 from the air pressure in the air chamber 5, the sealant 7 is prevented from being offset to the outer circumferential side of the tube 2, even if the centrifugal force due to rotation of the vehicle wheel acts on the sealant 7 in the sealant chamber 6. Accordingly, the sealant 7 can immediately repair punctures by filling them in. Furthermore, leakage of air from the air chamber 5 is slowed down. Also, the sealant 7 is held in the sealant chamber and does not flow to the air chamber 5. This prevents the air valve 13 and pressure gauge built into the air valve etc., from becoming clogged up.

Figure 2:
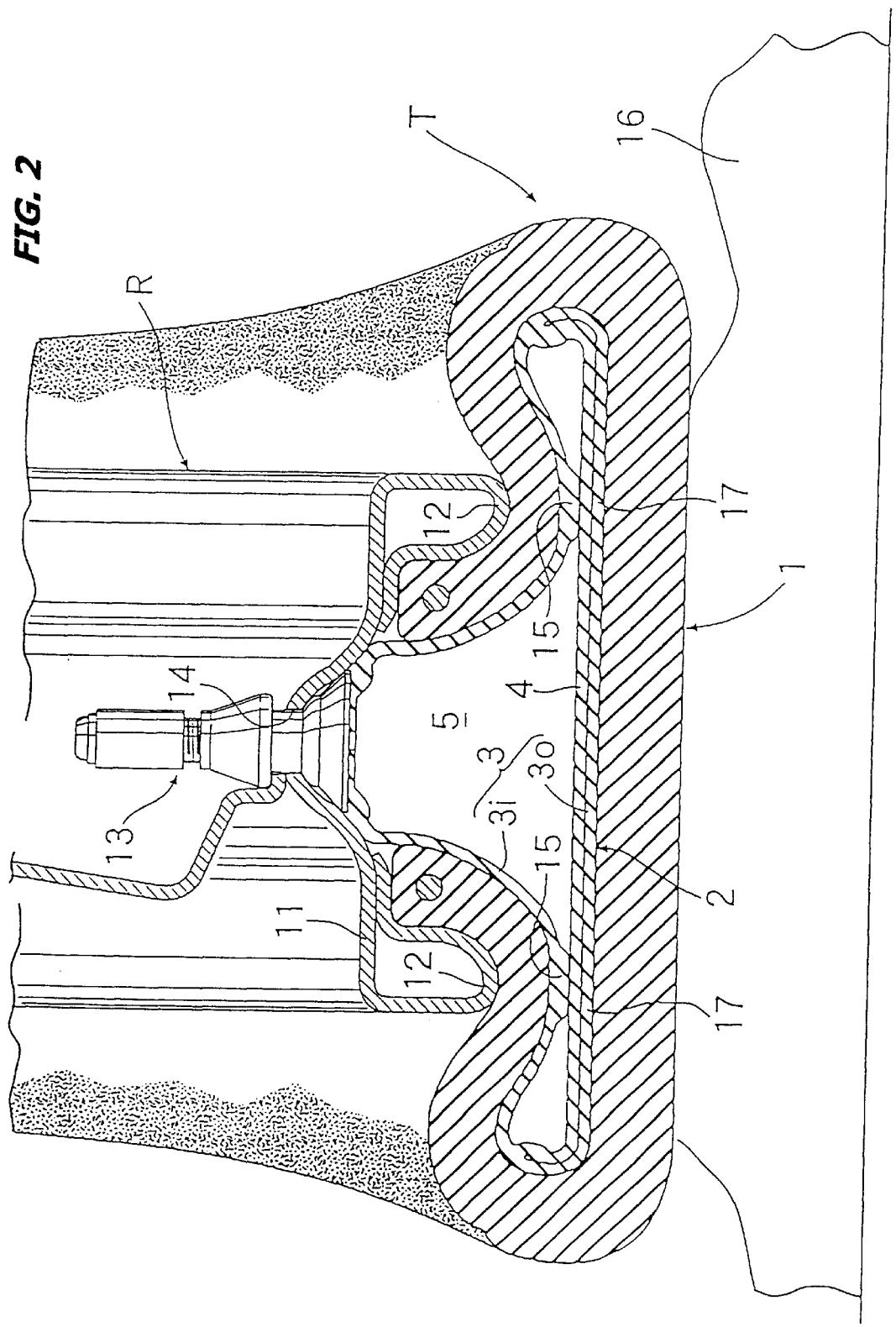
FIG. 2 is an explanatory drawing showing a condition the wheel of FIG. 1 has been grounded on an obstacle.

As shown in FIG. 2, if the tube tire T is subjected to an impulsive load when being grounded on obstacles on a road surface, flange sections 12, 12 of the rim R compress the tire body 1 and the tube 2 in a radial direction. The tire body 1 and the tube 2 are therefore pinched between flange portions 12, 12 of the rim R projecting outwardly in a radial direction and the previously described obstacles 16. The thickened portions 15, 15 and the thin portions 17, 17 of the tube 2 (refer to FIG. 2) sandwich the partition 4 and come into contact with each other. However, the thickened sections 15, 15 are not damaged due to the increase in strength. Furthermore, since a load acting on the thin portions 17, 17 and the partition 4 is distributed by the thickened sections 15, 15 which are prone to elastic deformation, the thin portions 17, 17 and the partition 4 are also be protected against damage caused by the load.

According to the present invention, it is therefore possible to avoid reduction in durability with a simple construction wherein only the thickened sections 15, 15 formed at parts of the tube 2 have a wall thickness larger than the remaining portions. Furthermore, the weight of the tube is not substantially increased and manufacturing costs of the tube tire T are not increased.

A method of manufacturing the above described tube 2 will now be described with reference to FIG. 3. The process of manufacturing the tube 2 comprises the following steps, carried out in sequence; namely, a material mixing step, a tube blank extruding and formation step, a cutting step, an air valve attaching step, a hole making step, a bonding step, a first vulcanizing step, a sealing agent filling step, a natural rubber sheet pasting step, a second vulcanizing step, and an inspection step.

First of all, in the tube blank extruding and formation step, by extruding and forming raw material that has been mixed in the material mixing step, a tube blank 2' comprised of natural rubber is formed. The tube blank 2' is continuously extruded and formed from a nozzle of an extruder. The tube blank 2' is provided with a peripheral wall 3 having a circular cross section and a partition 4 connecting at two positions on the diameter of the peripheral wall 3. The peripheral wall 3 is divided into an air chamber peripheral wall 3$i$ and a sealant chamber peripheral wall 3$o$, with the border between the two connecting with the partition 4. The thickened sections 15, 15 are integrally formed on the air chamber peripheral wall 3$i$.

After the tube blank 2' has been cut to a specified length in the subsequent cutting step, an air valve 13 is attached to a suitable place on the air chamber peripheral wall 3$i$ in the air valve attaching step, and a sealing filling hole $3_1$ is made in the sealant chamber peripheral wall 3$o$ of the tube blank 2' in the hole making step.

After the two ends of the tube blank 2' have been bonded by pressure welding in the bonding step, in the first vulcanizing step the tube blank 2' is inserted into a heating mold, the air chamber peripheral wall 3$i$ and the sealant chamber is peripheral wall 3$o$ are firmly stuck against the heating mold while the partition 4 is firmly stuck against the sealant chamber peripheral wall 3$o$ by supplying heated air or high temperature steam from the air valve 13 into the air chamber 5. In this state, vulcanizing is carried out by heating the heating mold.

Figure 6:
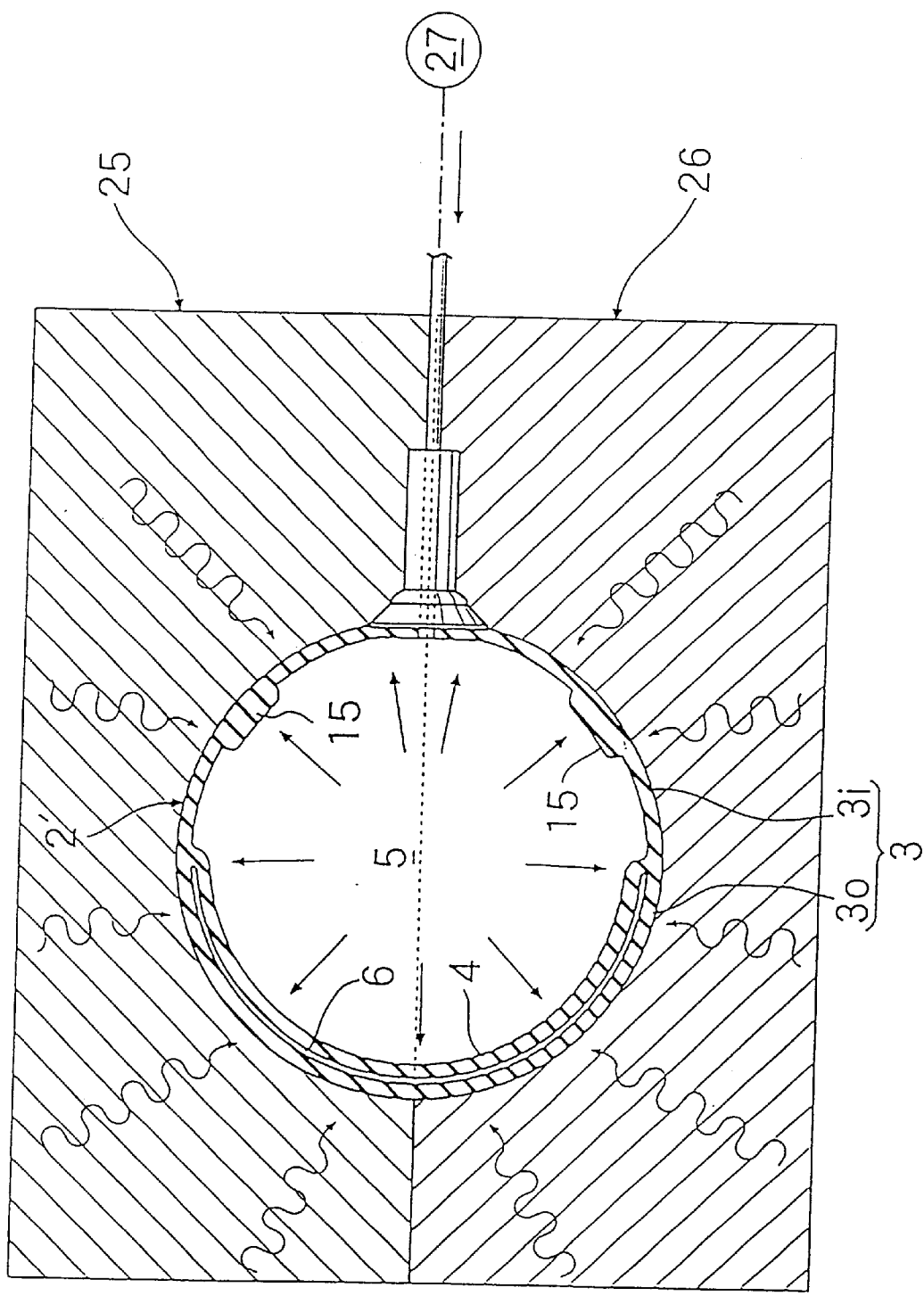
FIG. 6 is a drawing showing the first vulcanizing according to the process of FIG. 3.

FIG. 6 is a drawing showing a heating mold used in the above described first vulcanizing process. The heating mold for the vulcanizing process comprises an upper mold 25 and a lower mold 26. While high temperature air (or high temperature steam) is being supplied from a high temperature air supply 27 through the air valve 13, the upper mold 25 and lower mold 26 are heated and the tube 2 is vulcanized from the tube blank 2'.

At this time, the formation surfaces of the upper mold 25 and lower mold 26 are arranged horizontally. Therefore, at a stage of the tube blank 2' before the vulcanization, the thickened sections 15, 15, projecting outwardly in a radial direction from the air chamber peripheral wall direction from the air chamber peripheral wall 3$i$, follow the formation surfaces of the upper mold 25 and the lower mold 26 and project inwardly in a radial direction. Vulcanization is carried out in the state shown in FIG. 6.

In the subsequent sealant filling step, the sealant chamber 6 is filled with sealant 7 from the sealant filling hole 31. At this time, before filling with sealant, the partition 4 is fixed firmly against the sealant chamber peripheral wall 3$o$ and the air is completely expelled from the sealant chamber 6 by supplying air from the air valve 13 and inflating the air chamber 5. Filling of sealant 7 is commenced from this state. In this way, by commencing filling of the sealant 7 from the state where air in the internal airspace of the sealant chamber 6 has been completely expelled, it is possible to effectively prevent air from being mixed with the sealant 7 and only sealant is injected into the sealant chamber 6. Also, since air is supplied into the air chamber 5 using the air valve 13, there is no need to form holes for injecting air into the air chamber peripheral wall 3$i$.

After a natural rubber sheet has been pasted so as to cover the sealant filling hole $3_1$ in the subsequent natural rubber sheet pasting step, the tube 2 is completed by occluding the sealant filling hole $3_1$ by partially vulcanizing the area around the natural rubber sheet 18 in the second vulcanizing step. Since the sealant filling hole $3_1$ is occluded using natural rubber that is the same material as the tube blank 2', the strength of the occluded section is improved and it is possible to effectively prevent sealant 7 from leaking out. The completed tube 2 is inspected in the inspection step, thus completing the manufacturing process.

Figure 4:
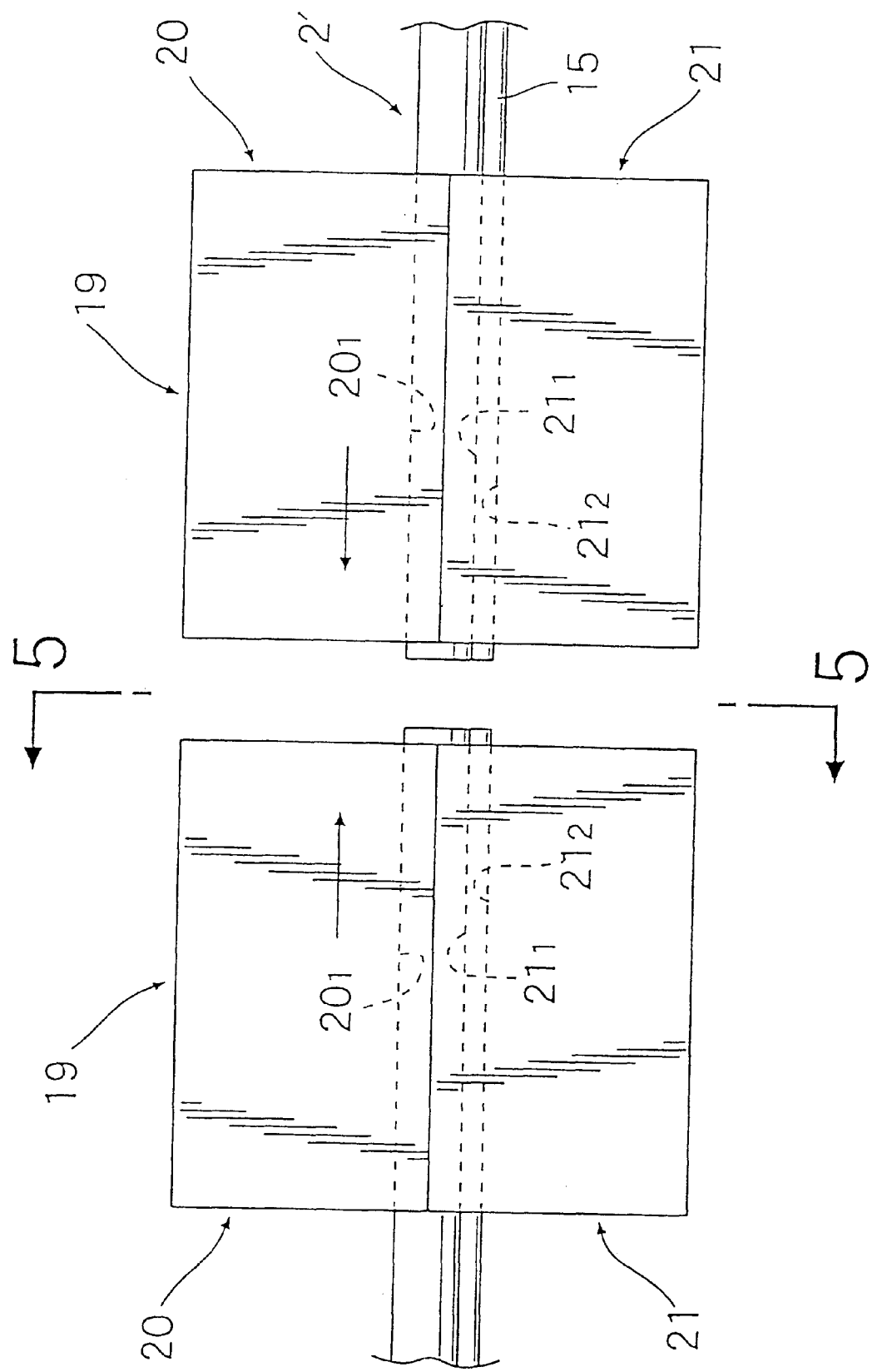
FIG. 4 is a drawing showing the step of bonding the tube according to the process of FIG. 3.
Figure 5:
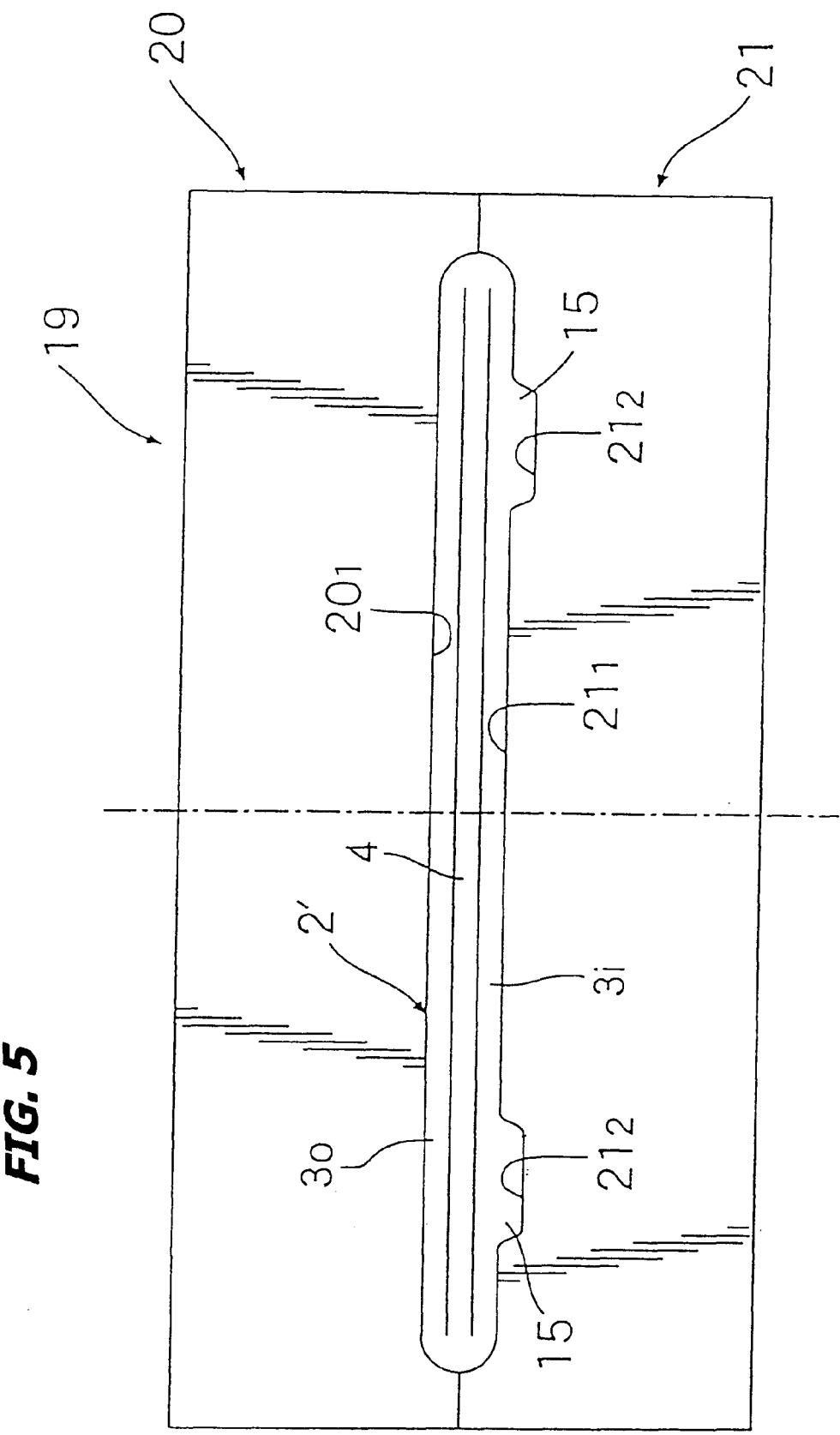
FIG. 5 is a drawing in the direction of arrow 5—5 in FIG. 4.

A retention mold 19 used in the above described bonding step is shown in FIG. 4 and FIG. 5. The retention mold 19 for respectively holding the two cut ends of the tube blank 2 comprises an upper mold 20 and a lower mold 21 that open and close with respect to each other. Shallow thin-shaped holding surfaces $20_1$ and $21_1$ intended to hold the tube blank 2' in a horizontally compressed state are indented in opposite portions of the upper mold 20 and the lower mold 21. A pair of indents $21_2$ and $21_2$ for engaging with the thickened sections 15, 15 of the tube blank 2' are formed in the holding surfaces $21_1$ of the lower molds 21. As has been described above, at a stage before the tube blank 2' is vulcanized, a pair of thickened sections 15, 15 project outwardly in a radial direction from the air chamber peripheral wall 3i.

When an end of the tube blank 2' is held between the upper mold 20 and the lower mold 21 of the retention mold 19, the thickened sections 15, 15 of the tube blank engage with the indents $21_2$, $21_2$ of the lower mold 2, thus reliably holding the tube blank 2' without warping it. Furthermore, it is possible to precisely bond the two ends.

Figure 7:
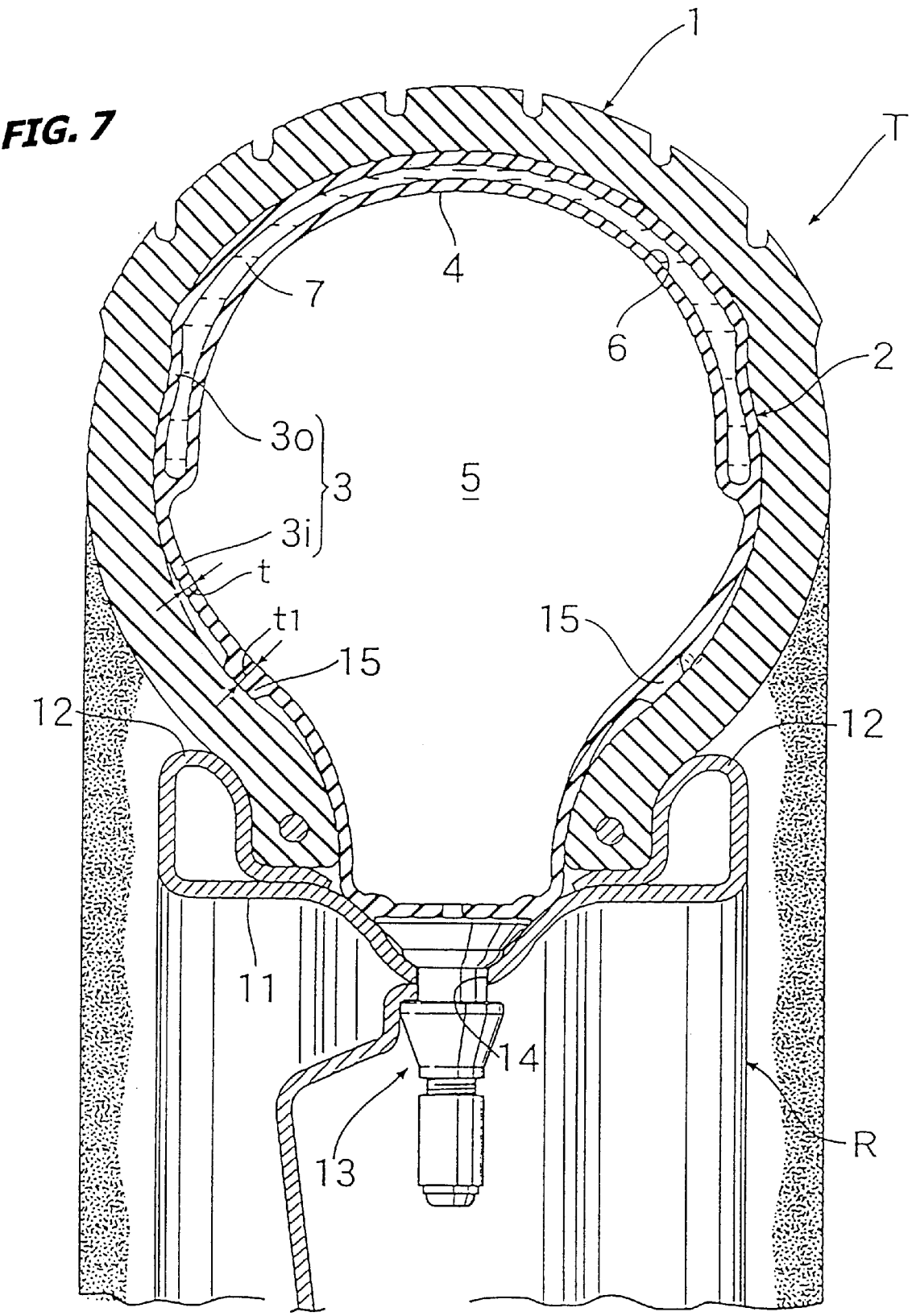
FIG. 7 is a cross sectional drawing of a wheel holding a tube tire according to a second embodiment of the present invention.
Figure 8:
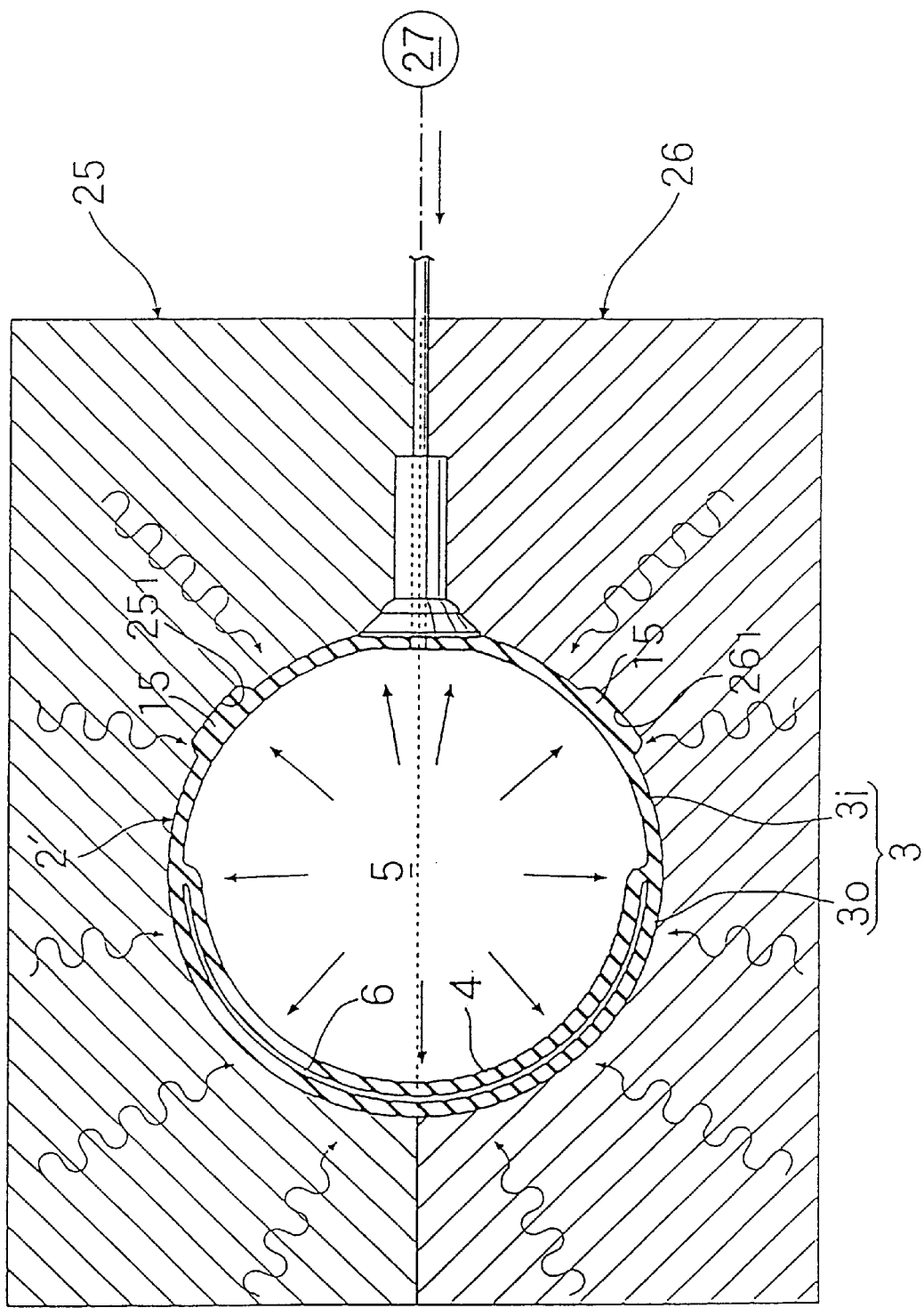
FIG. 8 is a drawing showing the first vulcanization step according to a process of manufacturing a tube according to the second embodiment.

FIG. 7 and FIG. 8 show a second embodiment of the present invention. As is clear from a comparison of FIG. 1 (first embodiment) and FIG. 7, the thickened sections 15, 15 of the first embodiment project inwardly from the air chamber peripheral wall 3i of the tube in a radial direction, while the thickened sections 15, 15 of the second embodiment project outwardly from the air chamber peripheral wall 3i of the tube in a radial direction. The construction of the tube blank 2' is the same in both embodiments, but as shown in FIG. 8, in the second embodiment, the indents $25_1$ and $26_1$ are formed in the formation surfaces of the upper mold 25 and lower mold 26 for vulcanization. Furthermore, by engaging the thickened sections 15, 15 of the tube blank 2' with these indents $25_1$ and $26_1$ the thickened sections 15, 15 of the completed tube 2 project outwardly in a radial direction.

Embodiments of the present invention have been described in detail above. However, various modifications can be made to the present invention without departing from the spirit and scope of the appended claims.

For example, a tube 2 containing sealant has been exemplified in the embodiments, but the present invention can also be applied to an ordinary tube that does not contain sealant. Also, it is possible to provide other thickened portions on the sealant chamber peripheral wall 3o of the tube that are capable of coming into contact with the above described thickened sections 15, 15 provided on the air chamber peripheral wall 3i of the tube 2. In this case, it is also necessary to form indents in the retaining surface $20_1$ of the upper mold 20.

According to the present invention described above, when both ends of a tube blank are horizontally retained in freely opening and closing retention molds and joined together, by forming indents for engaging with thickened portions projecting from an outer surface of the tube blank in the retaining surfaces of the retention molds it is possible to hold the tire blank without warping the tire blank and to precisely bond the two ends together.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of manufacturing a tire tube comprising the steps of:

extruding a tube blank having thickened parts extending from an outer surface thereof;

cutting the extruded tube blank to a predetermined length;

retaining opposite ends of the tube blank adjacent to each other in a retention mold;

engaging the outer surface of said tube blank with retention surfaces formed in the retention mold;

engaging thickened parts of the tube blank with permanent indents formed in the retention mold;

bonding the opposite ends of the tube blank to each other;

providing a vulcanizing mold, said vulcanizing mold having an internal cavity with a generally smooth circumferential surface;

inserting said tube blank into said internal cavity of said vulcanizing mold with the thickened parts engaging the generally smooth circumferential surface; and vulcanizing said tube blank to turn over the thickened parts to protrude from an inner surface of said tube blank.

2. The method of manufacturing a tire tube according to claim 1, further comprising the steps of:

providing a partition in the tube blank to form an air chamber and a sealant chamber;

forming a hole in the sealant chamber;

filling the sealant chamber with sealant through the hole; and sealing the hole with a rubber sheet.

3. The method of manufacturing a tire tube according to claim 2, further comprising the step of exhausting the air out of the sealant chamber before the filling step.

4. The method of manufacturing a tire tube according to claim 2, further comprising the steps of:

performing a first vulcanizing operation on the tube blank after the bonding step; and performing a second vulcanizing operation after the rubber sheet sealing step.

* * * * *